2,937,154
Patented May 17, 1960

2,937,154

METHOD OF MAKING LINOLEUM AND THE LIKE

Richard Almy, Lancaster Township, Lancaster County, Pa., assignor to Armstrong Cork Company, Lancaster, Pa., a corporation of Pennsylvania No Drawing. Application December 5, 1955
Serial No. 550,820

9 Claims. (Cl. 260—19)

The invention relates to a method of making linoleum and the like with a modified conventional binder system which includes a blend of an oxidized siccative oil and resin. Linoleum cement is generally prepared by the so-called Walton process where the oil, such as linseed oil, soya oil, tall oil, or mixtures thereof, is heated with driers, and optionally with a resin such as rosin, ester gum, Kauri gum, or other natural or synthetic resin or mixtures thereof, and air is blown through the oil to oxidize the same and produce what is known as "linoxyn" and an oxidized but uncoagulated oil fraction. Generally, the binder includes about 65% to 85% of the processed siccative oil and 15% to 35% of resin which may be added to the oxidized oil if the oil is not oxidized in the presence of the resin. Where tall oil is employed with a siccative oil, the resin component of the tall oil is taken into account in proportioning the resin and oil.

The cement or binder is distributed over filler and pigment particles to form what is known as a linoleum composition. Where sheet flooring is to be made, the linoleum composition may be calendered onto a foundation of burlap, impregnated felt, or the like. To provide a wear-resistant finished product, the covering thus prepared is hung in festoons in a large curing oven and heat is applied to substantially completely polymerize the oil fraction of the binder system. A conventional linoleum composition made of oxidized siccative oil and resin on a cotton duck foundation, the linoleum composition layer being 1/8" thick, may require stoving or maturing for a period of 47 days at about 200° F. to effect the essentially complete polymerization of the oil fraction necessary to produce a final product having the desired physical properties for floor covering uses.

Attempts have been made to reduce the time required for maturing the linoleum composition, and resinous condensation products of aldehydes with phenols and cresols have been suggested as hardening diluents. Turkington Patent 1,988,616 discloses the addition of certain oil soluble phenol-aldehyde resins to unprocessed oil and the subsequent heat-thickening of the oil by the so-called Taylor process and mentions the use of this product as a binder for linoleum.

According to this invention, linoleum is made utilizing a conventional binder system such as a substantially completely oxidized mixture of linseed oil and resin. As one step in the process, a hard, heat-reactive, phenol-aldehyde type resin which is soluble in the oxidized oil and capable of accelerating the maturing of the binder system upon application of heat thereto is added to the composition in the form of an aqueous dispersion of finely divided solid particles of the maturing accelerator resin.

The effectiveness of the maturing accelerator is improved by the present process, for surprisingly the presence of the aqueous vehicle in which the particles of maturing accelerator resin are suspended appears to favorably affect the functioning of the process. It is known that a more uniform distribution of the particles throughout the composition is obtained using the conventional mixing tackle available in the linoleum industry with the water dispersion than when the same resin in dry powder form is used. The presence of agglomerates of resin particles which would adversely affect the surface finish of the linoleum and would reduce the effectiveness of the accelerator is avoided also. The water film which surrounds the resin particles also may serve to reduce the tendency for the resin to react undesirably during mixing and calendering of the composition where heat is developed or may be applied to facilitate the formation of the product. Until such water has been removed, the temperature of the resin cannot, of course, exceed about 212° F. The exact reasons for the improvement in effectiveness are not known but are probably the result of a combination of the foregoing factors and possibly others of equivalent or even greater importance.

The aqueous dispersion of maturing accelerator resin may be added to the oxidized oil and resin mixture at any time after the heated oxidized oil has reached a temperature below about 300° F. Conveniently this may be accomplished by adding the dispersion to the oxidized oil resin binder as the same is being mixed with filler in a so-called preblending operation, for this will insure the formation of a substantially homogeneous mixture of the maturing accelerator resin with the oxidized oil component of the binder system with which it is to react to effect acceleration of the maturing of the final linoleum composition.

Care should be exercised in the treatment of the composition during and subsequent to the addition of the maturing accelerator resin to guard against the resin attaining a temperature at or above its activation temperature for any protracted period of time if it is desired to reuse the selvage material from the calender or, in the case of inlaid linoleum, to rework any rejected blocks, edge trimmings, or the like. The resin may be reactive to a slight degree at normal mixing and calendering temperatures, up to 280° F.; but since there is a time-temperature relationship involved in the reaction, heating at temperatures up to 300° F. for the short periods of time involved in mixing, calendering, and the like will not deleteriously affect the proper functioning of the process. As mentioned above, until the water film which surrounds the resin particles has been removed, the resin will not attain a temperature substantially above 212° F.

After mixing of the binder system, including the maturing accelerator, with the filler and pigment particles and formation of the product into the desired shape such as a sheet formed upon a fabric backing, the material is heated to a temperature which will effect activation of the maturing accelerator resin. This is conveniently effected by delivering the sheet to a conventional maturing stove where the material may be hung in festoons and heat applied to effect the final conversion of the binder system to provide a tough and wear-resistant product. As mentioned previously, this is believed to be essentially a polymerization reaction which occurs in the oxidized but uncoagulated oil component of the binder system, such polymerization occurring upon elevation of the temperature of the composition and being more rapidly advanced in the presence of the heat-reacting maturing accelerator resin. Condensation of the maturing accelerator resin probably occurs, and it is believed that the resin which is soluble in the oxidized oil also reacts with the oil. The exact mechanism which is involved in maturing or curing a linoleum composition is not fully understood; and it is, therefore, not possible to state with certainty the chemical reactions involved in maturing a linoleum composition with the aid of a phenol-aldehyde resin maturing accelerator.

The amount of maturing acecelerator resin added to the linoleum composition will vary, depending upon the particular cement used, the method of oil oxidation, the quantity of oxidized but uncoagulated oil present in the binder system, and other variable factors. Generally, from about 1% to 20%, and preferably 1% to 10%, of resin based on the weight of the total binder is adequate. Less than 1% will provide insignificant acceleration of the maturing time. More than about 20% may result in formation of a product which will be too hard for some uses.

Any heat-reactive, phenol-aldehyde resin known to be soluble in the oxidized oil used in the binder system which is also known to have an accelerating action on the maturing of the composition through polymerization of the oxidized but uncoagulated oil fraction of the binder system may be used in the present process. The heat-reactive resinous reaction product formed by condensation of an alkylated phenol with formaldehyde is quite acceptable.

The following example, in which all proportions are by weight, illustrates one mode of practicing the invention:

A mixture of 75 parts of linseed oil, 2 parts of drier, and 25 parts of rosin are charged into a mechanical oxidizer and heated to about 200° F. Air is delivered to the oxidizer and brought into contact with the charged mixture. At the end of about 30 hours, the mixture in a thickened but flowable condition is discharged from the oxidizer and permitted to cool. A semisolid gel results. This gel in its semiliquid state is charged into a mixing kettle and wood flour or other filler is added to form a dry, crumbly mass. The dispersion of maturing accelerator resin is preferably added slowly to the mass of binder and wood flour during the mixing operation, but it may be added prior to the wood flour or thereafter. It also may be added to the composition subsequent to the preblending operation as in the usual so-called B & Z mixers where mineral fillers and pigments are customarily added, on roll mills, or other mixing tackle. By adding it with the wood flour during preblending, as noted above, a uniform distribution of the dispersion within the mass of gelled binder is obtained conveniently.

A typical linoleum composition may be compounded as follows:

| | Parts |
|---|---|
| Linoleum cement | 211 |
| Wood flour | 144 |
| Filler and pigments | 234 |
| Maturing accelerator resin dispersion (50% solids) | 22 |

The resin dispersion is prepared by placing the powdered resin as received from the manufacturer in a pebble mill with water and a dispersing agent. The following mixture may be charged into a pebble mill such as a commercial size "Szegvari Attritor Mill," manufactured by Union Process Co., Akron, Ohio. Other equipment suitable for forming a dispersion of relatively small particle size may be used.

| | Parts |
|---|---|
| Phenol-aldehyde resin | 49.0 |
| Dispersing agent | 2.0 |
| Water | 49.0 |

The dispersing agent may be a mixture of 0.1 part disodium phosphate and 1.9 parts Darvan #1, a sodium salt of a polymerized alkyl-aryl sulfonic acid. Other well-known dispersing agents may be substituted. The dispersion will contain about 50% solids. The pebble milling should be continued for about one hour, or until a homogeneous dispersion of the resin particles in the aqueous medium has been effected. A microscopic examination of a typical dispersion of resin prepared as described above showed that the resin particles varied in size from less than 1 micron to a maximum of about 10 microns. The average particle size was estimated to be in the range of about 3 microns. It is preferred, of course, to grind the resin to a reasonably small size, for the finer the particles, the more surface area available for contact with the oil and the better the distribution of the particles through the composition for the acceleration action.

The linoleum composition is fed to a two-roll calender and there formed into a sheet about ⅛" thick, 72" wide, and of long length, directly onto a supporting carrier of cotton duck. The formed sheet may be hung in festoons, about 90' long, in a curing oven heated to about 200° F. In about 35 days' time, maturing will proceed to the desired extent and heating may be discontinued and the material may be withdrawn from the stove, ready for further fabrication. In the manufacture of resilient tiles from the matured composition, the duck will be stripped from the back of the sheet for reuse. The linoleum sheet will then be cut into tiles, say 6" x 6" or 9" x 9" and will be ready for packaging and shipment.

The product will have a smooth face, free of any objectionable resin agglomerates and will be adequately matured, i.e. the siccative oil will be essentially wholly polymerized and free of any substantial quantity of oxidized uncoagulated oil and a product of the desired hardness for floor tile use will have been formed. The product will have qualities equal at least to the same composition without the maturing accelerator resin heated to the same temperature for a period of 47 days. In other words, the curing or maturing time may be reduced by about 25% without any loss in quality of the finished product. In addition, the physical qualities will be superior to those of the same composition including the same maturing accelerator resin added to the mix as a dry powdered resin and heated for the same time at the same temperature. As mentioned previously, the combination of the maturing accelerator resin with the oxidized oil component in which the resin is soluble, with the resin being in the form of an aqueous dispersion at the time of its interspersion with the oxidized oil component, and the subsequent heating of the linoleum composition to a degree above the activating temperature of the resin, results in an unexpectedly rapid maturing of the linoleum composition.

The proportioning of the various binder and filler ingredients will vary widely and is not critical. Linoleum compositions are known to vary, depending upon the nature of the product to be produced. For instance, a linoleum composition to be used in the manufacture of desk top linoleum will be formulated differently than a linoleum composition for floor use, a wall covering linoleum composition will be formulated differently than either a floor or desk top linoleum, and so forth. Actually, different formulations are used where the material is to be formed into a sheet by a calendering operation than that used where a molded inlaid linoleum is to be produced. The present invention is applicable to all of these various types and kinds of linoleum compositions. In fact, the invention is useful with all linoleum and similar compositions which include an oxidized but uncoagulated siccative oil component which when subjected to heat undergoes a polymerization action which may be accelerated by the addition thereto of a maturing accelerator resin of the class above defined.

I claim:

1. A method of forming a cured linoleum product from linoleum cement together with pigment and filler particles comprising: mixing into a linoleum cement comprising a semisolid maturable oxidized siccative oil gel in which a portion of the oxidized oil is polymerized to linoxyn and another portion is polymerizable about 1% to about 20% by dry weight based on the weight of the linoleum cement of powdered solid particles of any heat-reactive, partially condensed phenol-aldehyde resin linoleum cement maturing accelerator which is soluble in the oxidized oil component of said linoleum cement, said solid maturing accelerator resin particles being dispersed in an aqueous medium with water surrounding the individual particles; continuing mixing, with said aqueous medium protecting said maturing accelerator resin particles against the deleterious action of heat during mixing, until said accelerator resin is uniformly distributed throughout said linoleum cement, substantially free of accelerator resin particle aggregation; combining with the linoleum cement at any stage during the process filler and pigment particles so as to form a composition in which the linoleum cement containing the maturing accelerator resin is distributed over the pigment and filler particles to form a linoleum composition; forming the resultant linoleum composition into a sheet; and thereafter heating said sheet of linoleum composition to mature said linoleum cement under the accelerating effect of said maturing accelerator resin.

2. A method in accordance with claim 1 in which the temperature of the linoleum cement is maintained below about 300° F. during said mixing and sheet forming steps.

3. A method in accordance with claim 1 in which the maturing accelerator resin constitutes about 1% to about 10% dry weight based on the weight of the linoleum cement.

4. A method in accordance with claim 1 in which the linoleum cement and filler particles are preblended and the dispersion of maturing accelerator resin is added during preblending.

5. A method in accordance with claim 1 in which the linoleum cement has rosin incorporated therein and in which the maturing accelerator resin dispersion contains about 50% of solids and includes a dispersing agent for the maturing accelerator resin particles.

6. A method in accordance with claim 1 in which the maturing accelerator resin particles are of a maximum size of about 10 microns.

7. A method in accordance with claim 1 in which said dispersion of maturing accelerator resin is added to said linoleum cement which is in heated condition and at a temperature below about 300° F. and in which filler particles are added to the linoleum cement and maturing accelerator resin mixture by intense mixing.

8. A method in accordance with claim 7 in which the sheet is heated to a temperature of about 200° F. to mature the linoleum cement.

9. In a method of making linoleum from a linoleum composition including filler and pigment particles and a linoleum cement comprising 65% to 85% of a semisolid gel of oxidized siccative oil and 35% to 15% of rosin, together with 1% to 20% dry weight based on the weight of the linoleum cement of a heat-reactive, partially condensed phenol-aldehyde resin maturing accelerator for the linoleum cement, the improvement which comprises adding said maturing accelerator resin to said linoleum cement as an aqueous dispersion instead of as a dry powder and effecting mixing of said maturing accelerator resin with said linoleum cement while the maturing accelerator resin particles are coated with the water of said dispersion, and thereafter maturing the linoleum cement.

References Cited in the file of this patent

UNITED STATES PATENTS

| | | |
|---|---|---|
| 2,389,078 | Powers | Nov. 13, 1945 |
| 2,620,319 | Rowe et al. | Dec. 2, 1952 |

FOREIGN PATENTS

| | | |
|---|---|---|
| 411,828 | Great Britain | June 13, 1934 |

OTHER REFERENCES

Bentz et al.: J. Polymer Sci., 4, pp. 673–688 (1949).
Mehta: Paint, Oil and Chem. Rev., pp. 9–12, 46 (May 4, 1944).